United States Patent [19]

Doyle

[11] 4,279,874
[45] Jul. 21, 1981

[54] CU(1) ACETYLACETONATE COMPLEXES FOR CO SEPARATION

[75] Inventor: Gerald Doyle, Whitehouse Station, N.J.

[73] Assignee: Exxon Research & Engineering Co., Florham Park, N.J.

[21] Appl. No.: 141,055

[22] Filed: Apr. 17, 1980

[51] Int. Cl.³ .............................................. B01D 53/34
[52] U.S. Cl. ................................ 423/246; 423/415 A; 55/68
[58] Field of Search ................ 423/246, 415 A; 55/68

[56] References Cited

U.S. PATENT DOCUMENTS

| | | | |
|---|---|---|---|
| 1,875,920 | 9/1932 | Gordon et al. | 423/246 X |
| 3,252,269 | 5/1966 | Woertz | 55/68 X |
| 3,630,676 | 12/1971 | Davis | 423/246 X |
| 3,658,463 | 4/1972 | Billings | 423/246 |
| 4,048,292 | 9/1977 | Green | 423/415 A |

Primary Examiner—G. O. Peters
Attorney, Agent, or Firm—James H. Takemoto

[57] ABSTRACT

Carbon monoxide is selectively removed from a gas stream by a process which comprises contacting the gas stream with an absorbent solution containing the reaction product of a Cu(I) compound and a halogenated acetylacetone of the formula:

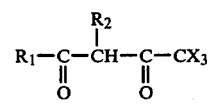

where X is a halogen, $R_1$ is $CX_3$, linear or branched $C_1$ to $C_8$ alkyl, $C_4$ to $C_6$ heterocycle containing O, S or N or $C_6$ to $C_{10}$ aryl, $R_2$ is hydrogen or $C_1$ to $C_6$ alkyl, or $R_1$ and $R_2$ are joined together to form a $C_6$ ring.

10 Claims, No Drawings

CU(1) ACETYLACETONATE COMPLEXES FOR CO SEPARATION

BACKGROUND OF THE INVENTION

1. Field of the Invention

This invention relates to a method for absorbing carbon monoxide from a gas stream. In particular, the absorbing agent is the reaction product of a Cu(I) compound and a halogenated acetylacetone.

2. Description of the Prior Art

It is well-known that cuprous salt solutions will absorb carbon monoxide (CO). A review of the early literature relating to this topic may be found in J. Appl. Chem. (London), 15, 17–28 (1965).

U.S. Pat. Nos. 3,401,112 and 3,517,079 relate to methods of separating olefins and vinyl aromatics using cuprous salts of fluoro-substituted carboxylates, fluoroborates and fluorophosphates. A process for separating CO from gas mixtures using copper (I) salts of sulfonic acids or dialkyl phosphates is disclosed in U.S. Pat. No. 4,042,669. U.S. Pat. No. 4,048,292 teaches a method for preparing high purity CO from $CO_2$-free gas streams using a copper ammonium $C_{1-2}$ acetate as the absorbent medium.

While many Cu(I) compounds are known to form carbon monoxide-containing complexes, they suffer from one or more disadvantages such as high corrosivity, low reactivity to CO, high energy cost to regenerate CO, low selectivity to CO and instability of the absorbent system. It would be highly desirable to have a method for selectively and efficiently removing CO from a gas stream while at the same time being able to regenerate the absorbent system and recovering CO under mild conditions.

SUMMARY OF THE INVENTION

It has been discovered that carbon monoxide can be selectively removed from a gas stream by a process which comprises contacting the gas stream with an absorbent solution containing an inert solvent and a Cu(I) salt, said salt being the reaction product of a Cu(I) compound and a halogenated acetylacetone of the formula:

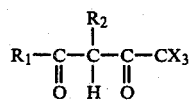

where X is F or Cl, $R_1$ is $CX_3$, linear or branched $C_1$ to $C_8$ alkyl, $C_4$ to $C_6$ heterocycle containing O, S or N, or $C_6$ to $C_{10}$ aryl, $R_2$ is hydrogen or $C_1$ to $C_6$ alkyl, or $R_1$ and $R_2$ are joined together to form a $C_6$ ring.

The process of the invention has the advantage that CO is selectively removed from the gas stream. Also, the carbonyl-containing complex which is formed upon CO absorption is readily decomposed under mild conditions, thereby regenerating the absorbing medium and CO at low energy cost. It is generally not necessary to pretreat the gas stream to remove gases such as olefins and $CO_2$.

DETAILED DESCRIPTION OF THE INVENTION

The Cu(I) salts which react with CO to yield CO-containing complexes are formed by reacting a Cu(I) compound with halogenated acetylacetone. In a preferred embodiment, a basic cuprous compound such as $Cu_2O$, CuOH, CuOR or CuR where R is alkyl or aryl is treated with halogenated acetylacetone and the resulting acid-base reaction forms the Cu(I) salt. Another method making Cu(I) salts involves reacting the halogenated acetylacetone with a base such as NaOH and adding the resultant salt to a cuprous compound such as CuCl, CuCN or $Cu_2SO_4$.

Preferred Cu(I) salts for absorbing CO are the reaction products of a Cu(I) compound and a fluorinated acetylacetone of the formula:

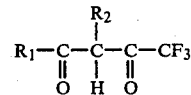

where $R_1$ is $CF_3$, linear or branched $C_1$ to $C_6$ alkyl, $C_6$ to $C_{10}$ aryl, $C_4$ to $C_5$ heterocycle containing O, S or N, $R_2$ is hydrogen, or $R_1$ and $R_2$ together form a $C_6$ ring. Especially preferred fluorinated acetylacetones include:

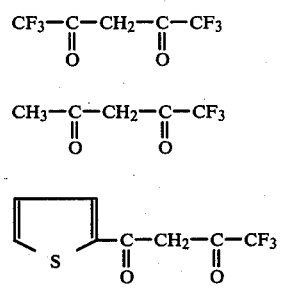

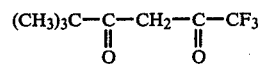

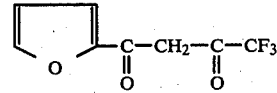

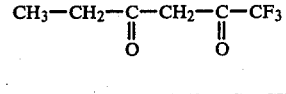

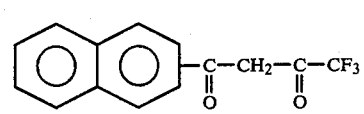

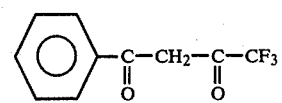

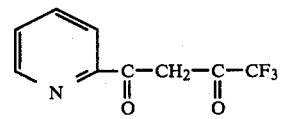

-continued

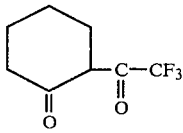

Preferred inert solvents for the Cu(I) salts are ethers, ketones, esters, alcohols, aliphatic hydrocarbons, aromatic hydrocarbons, and halogenated derivatives thereof.

Cu(I) salt concentration for absorbing CO are not critical and can vary over wide ranges. In order to maximize CO absorption, higher concentrations of Cu(I) salts of at least 0.001 M are preferred, especially 0.01 to 5 M.

Carbon monoxide absorption can occur over a broad temperature range of from $-80°$ to $+100°$ C., preferably $-10°$ to $+40°$ C. The carbon monoxide partial pressure can be from 0.001 atm to 1000 atm, preferably 0.1 to 10 atm. Generally, as one increases the temperature of the absorbing medium, it is preferred to operate the subject process at higher ranges for the CO partial pressure. The increased CO partial pressure at higher temperatures helps to stabilize the CO-containing Cu(I) complex and also increases efficiency of absorption.

The gas stream from which CO is to be removed may contain other gases such as $N_2$, $O_2$, $CO_2$, alkanes, alkenes, alkynes, aromatics, $H_2O$, $H_2$, $SO_2$, $SO_3$, $H_2S$, $NH_3$ and nitrogen oxides. Gases such as olefins and acetylenes which might be expected to compete with CO do not affect the present process even in relatively high concentrations, nor is it poisoned by $CO_2$ or $H_2O$.

In order to desorb CO from the Cu(I) carbon monoxide-containing complex in solution, the solution may be purged with a CO-free inert gas, heated to temperatures of from 30° to 200°, preferably 50° to 150° C. in the absence of CO, or both purged with inert gas and heated. The nature of the inert purging gas is not critical so long as it is CO-free. Air and $N_2$ are preferred purging gases.

While not wishing to be bound to any particular theory, it appears that when CO is absorbed by the solution of Cu(I) salt containing a halogenated acetylacetone as ligand, an equilibrium is established which in the presence of CO lies far to the right, i.e., in favor of the CO-containing complex. The precise identity of the Cu(I) salt and CO complex is difficult to determine due to the complexity of Cu(I) solution chemistry. By purging with inert gas, heating or both, the equilibrium is shifted to favor the desorption process which results in the original Cu(I) salt and free CO.

The process of the invention may be batchwise or continuous. One preferred embodiment for practicing the subject process is described as follows. The gas stream containing CO is contacted with the absorbing solution of Cu(I) salt. Typically, a countercurrent extractor may be employed wherein the absorbent solution is passed downwardly through the extractor while the gas stream flows upwardly. The gas stream exiting the countercurrent extractor is monitored for CO content and the flow rates of gas and/or absorbent solution may be adjusted accordingly.

The solution leaving the bottoms of the countercurrent extractor contains the Cu(I) CO-containing complex and is conducted to a desorption stage. CO may be freed from the complex by heating preferably under reduced pressure to facilitate decomposition. The CO thus obtained is pure and may be further processed as desired. Alternatively, the solution from the countercurrent extractor may be purged with a CO-free inert gas such as air or $N_2$ in a second countercurrent extractor. The solution from which CO has been desorbed is then recycled to the first countercurrent extractor for further CO absorption.

The process of the invention is further exemplified by the following examples.

EXAMPLE 1

A suspension of 10 mmole $Cu_2O$ in 100 ml tetrahydrofuran was prepared and 20 mmole hexafluoroacetylacetone was added to this mixture. After stirring, most of the $Cu_2O$ reacted to form a clear solution containing a Cu(I) hexafluoroacetylacetonate salt. A gaseous mixture with the composition 18.9% CO, 42.4% $H_2$, 14.4% $CH_4$ 9.6% $C_2H_6$ and 14.7% $CO_2$ was then bubbled through the solution at room temperature and a complex was formed with a CO:Cu(I) salt ratio of 1:1. Analysis of the gas mixture over the solution indicated an essentially complete removal of CO.

In order to recover CO and regenerate the Cu(I) salt, $N_2$ was passed through the solution. Alternatively, the solution was heated to 50° C. until CO evolution ceased.

EXAMPLE 2

The procedure of Example 1 was repeated except that tetrahydrofuran is replaced with a solvent mixture of 90 ml of tetrahydrofuran and 10 ml water. Identical results were obtained showing that the absorption of CO is not appreciably affected by relatively large amounts of water.

EXAMPLE 3

The procedure of Example 1 was repeated except that the gaseous mixture bubbled through the Cu(I) salt solution contained about 50% $N_2$, 30% CO and 20% $C_2H_4$. An analysis of the solution and gas mixture over the solution indicated the formation of a 1:1 CO:Cu(I) complex and the nearly complete removal of CO from the gas. This demonstrates that the absorption of CO can take place in the presence of relatively large amounts of olefins.

What is claimed is:

1. A process for removing CO from a gas stream which comprises contacting the gas stream with an absorbent solution containing an inert solvent and a Cu(I) salt, said salt being the reaction product of a Cu(I) compound and a halogenated acetylacetone of the formula:

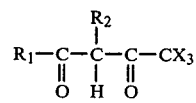

where X is F or Cl, $R_1$ is $CX_3$, linear or branched $C_1$ to $C_8$ alkyl, $C_4$ to $C_6$ heterocycle containing O, S or N, or $C_6$ to $C_{10}$ aryl, $R_2$ is hydrogen or $C_1$ to $C_6$ alkyl, or $R_1$ and $R_2$ are joined together to form a $C_6$ ring.

2. The process of claim 1 wherein X is fluorine.
3. The process of claim 1 wherein $R_2$ is hydrogen.
4. The process of claim 1 wherein the acetylacetone has the formula:

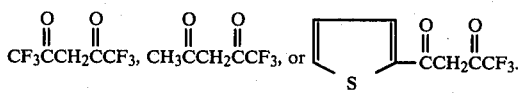

5. The process of claim 1 wherein the absorbent solution has a temperature of from −80° to +100° C.

6. The process of claim 1 wherein the gas stream has a CO partial pressure of from 0.001 to 1000 atm.

7. The process of claim 1 wherein the Cu(I) salt concentration is from 0.01 to 5 M.

8. The process of claim 1 wherein the Cu(I) compound is $Cu_2O$, CuOH, CuOR or CuR where R is alkyl or aryl.

9. A continuous process for recovering CO from a gas stream which comprises contacting the gas stream with an absorbent solution containing an inert solvent and a Cu(I) salt, said salt being the reaction product of a Cu(I) compound and a halogenated acetylacetone of the formula:

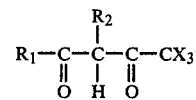

where X is F or Cl, $R_1$ is $CX_3$, linear or branched $C_1$ to $C_8$ alkyl, $C_4$ to $C_6$ heterocycle containing O, S or N, or $C_6$ to $C_{10}$ aryl, $R_2$ is hydrogen or $C_1$ to $C_6$ alkyl, or $R_1$ and $R_2$ are joined together to form a $C_6$ ring, heating the so-treated solution at from 30° to 200° C., and recovering the desorbed Co.

10. A continuous process for recovering CO from a gas stream which comprises contacting the gas stream with an absorbent solution containing an inert solvent and a Cu(I) salt, said salt being the reaction product of a Cu(I) compound and a halogenated acetylacetone of the formula:

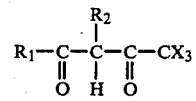

where X is F or Cl, $R_1$ is $CX_3$, linear or branched $C_1$ to $C_8$ alkyl, $C_4$ to $C_6$ heterocycle containing O, S or N, or $C_6$ to $C_{10}$ aryl, $R_2$ is hydrogen or $C_1$ to $C_6$ alkyl, or $R_1$ and $R_2$ are joined together to form a $C_6$ ring, purging the so-treated solution with a CO-free inert gas, and recovering the desorbed CO.

* * * * *